(12) United States Patent
Corliss (10) Patent No.: US 9,928,637 B1
(45) Date of Patent: Mar. 27, 2018

(54) MANAGING RENDERING TARGETS FOR GRAPHICS PROCESSING UNITS

(71) Applicant: Amazon Technologies, Inc., Reno, NV (US)

(72) Inventor: Christopher Ray Corliss, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 200 days.

(21) Appl. No.: 15/064,145

(22) Filed: Mar. 8, 2016

(51) Int. Cl.
*G06T 15/00* (2011.01)
*G06T 15/04* (2011.01)
*G06T 15/80* (2011.01)

(52) U.S. Cl.
CPC .......... *G06T 15/005* (2013.01); *G06T 15/04* (2013.01); *G06T 15/80* (2013.01)

(58) Field of Classification Search
CPC .................................................. G06T 15/04
See application file for complete search history.

(56) References Cited

U.S. PATENT DOCUMENTS

| | | | |
|---|---|---|---|
| 6,697,064 B1 * | 2/2004 | Kilgard | G06T 15/04 345/423 |
| 6,983,361 B1 * | 1/2006 | Blandy | G06F 9/30061 712/229 |
| 8,189,009 B1 * | 5/2012 | Brown | G06T 15/04 345/426 |

* cited by examiner

*Primary Examiner* — Kee M Tung
*Assistant Examiner* — Grace Q Li
(74) *Attorney, Agent, or Firm* — Hogan Lovells US LLP (57) ABSTRACT

Shader data can be fetched directly from render targets using languages that do not natively support such functionality. Flags can be set to ensure that render targets remain in memory of a graphics processing unit (GPU). Render targets can remain in GPU memory in part by avoiding an unbinding from the GPU, significantly reducing the data round trips needed between a central processing unit (CPU) and the GPU. The ability to fetch the data straight from on-chip memory provides better performance on the GPU since textures that reside on slower memory do not need to be sampled. Since fetching directly from render targets is not possible in certain languages, special texture registers can be dedicated. A compiler can be configured to detect when a special register is being used and to output the necessary shader instructions in a platform-specific language.

20 Claims, 7 Drawing Sheets

MANAGING RENDERING TARGETS FOR GRAPHICS PROCESSING UNITS

BACKGROUND

The availability of higher quality graphical content for various types of devices has increased the demand for such content. In order to provide this higher quality content on devices such as portable devices with relatively limited resource capacity, however, there is a need to continually improve the performance of the resources available for these devices. In the case of real-time graphics rendering, for example, each frame of content must be individually rendered by a rendering engine, and each frame or scene of content can include multiple objects to be rendered. Each object can include information such as geometry, viewpoint, lighting, texture, and shading information that must be processed for each image frame. The rendering for each frame can involve a separate pass over the various textures, where the pass can involve a process such as binding and sampling textures for use in the shading process. This can utilize significant resource capacity, and since textures are sampled from relatively slow memory, versus other available memory on these devices, the performance of the rendering can be degraded as well.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to rendering graphical content in an electronic environment. In particular, various embodiments enable shader data to be directly fetched from render targets using languages that do not natively support or expose such functionality. Flags or other indicators can be set to ensure that render targets remain in memory of a graphics processing unit (GPU). Render targets can remain in GPU memory in part by avoiding an unbinding from the GPU throughout the relevant portion of the rendering pipeline. The ability to avoid unbinding the render targets can significantly reduce the number of data round trips needed between a central processing unit (CPU) and the GPU. Further, approaches in accordance with various embodiments can fetch back the data needed straight from on-chip memory, such as the GPU memory, which provides better performance on the GPU since textures that reside on slower memory do not need to be sampled. Since fetching directly from render targets is not possible in languages such as the high-level shading language (HLSL), special texture slots can be dedicated whereby sampling can occur from these slots. A compiler, such as the HLSL cross compiler, can be modified to detect when one of the special registers is being used and to output the necessary shader instructions in a platform-specific language. The instructions can cause the render targets to be stored in these special locations and the platform-specific shader instructions to sample from those render targets directly. The main render targets remaining within the GPU enables them to be reused for various passes through the rendering pipeline.

Various other functions and advantages are described and suggested below as may be provided in accordance with the various embodiments.

Figure 1:
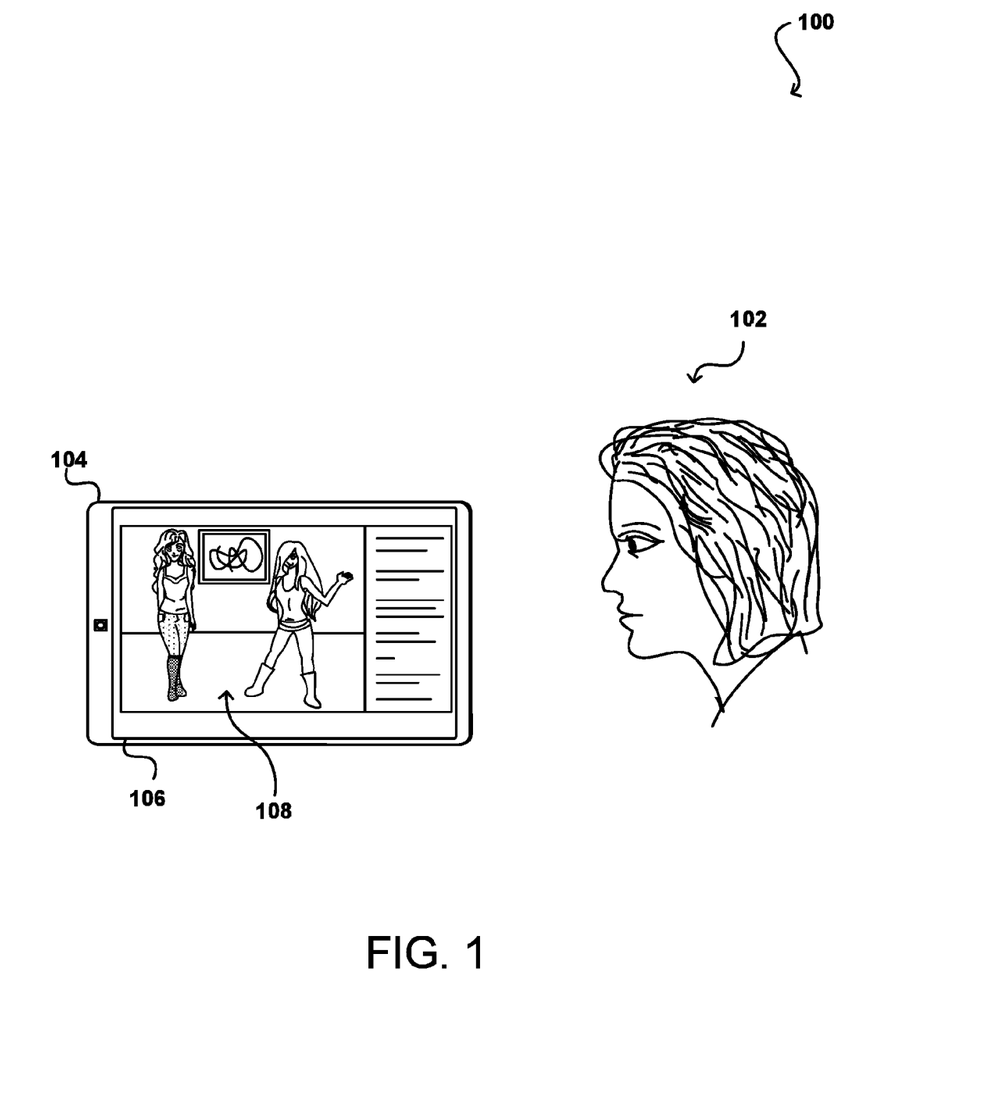
FIG. 1 illustrates an example situation wherein rendered content is being displayed on a computing device in accordance with various embodiments.

FIG. 1 illustrates an example situation 100 wherein a computing device 104 (or e-book reader or other such device) is displaying a frame 108 (or other such grouping) of rendered content, such as gaming or animation content, on a display screen 106 of the device 104. Although a portable computing device is illustrated for purposes of this example, it should be understood that various other types of devices can be utilized to display the content as well, as may include a tablet computer, a smart phone, a desktop computer, a notebook computer, a personal data assistant, a smart phone, a video gaming console, a television set top box, a wearable computer (e.g., a smart watch or glasses), or a portable media player, among other such devices. As known for such purposes, the content rendered can change in response to input from a user 102, such as where a user provides control into for a video game or point of view updates for an interactive animation, among other such options.

In order to generate the individual images, or "frames," of a scene of animation, the image can be "rendered" using models of the objects represented in the scene, as well as textures, colors, or other information that is to be applied to those models. Rendering generally utilizes a two- or three-dimensional model for each object represented in a scene, where the objects can include the background scenery, characters in the scene, items located within the scene, and other such objects. In some instances information for the objects for a scene will be contained in a scene file, where the objects are defined using a rendering language and/or data structure that contains information pertaining to various aspects of each object. These aspects can include, for example, the shape or geometry of each object (as may be represented by a wire mesh, etc.) and a point of view from which the object is to be rendered, as well as various lighting, shading, and texture information that can be used to determine how various portions of each object appear in the final rendering. The object data is processed using a rendering engine, for example, then output to an image file for display on the relevant device display.

Since the rendering of image data can be very processor intensive, various computing devices utilize separate components to perform the rendering and other such tasks. These rendering components often take the form of at least one graphics processing unit (GPU) operating as part of a graphics pipeline, which takes the rendering work away from the other central processing units (CPUs) or components present on the device. A GPU generally is a component dedicated to performing complex rendering tasks, such as determining effects for objects to be contained in the resulting image content to be displayed. This can include creating lighting effects and transforming objects each time a three-dimensional scene is redrawn. While in some embodiments pre-rendering can be used to create movies or other such "fixed" types of content, real-time rendering is used for content such as video games or user-controlled content where the display of content can change based at least in part upon receiving user input. The real-time rendering can generate views of the objects using the respective models from the determined point of view, then determine the appearance of those object views using textures (e.g., procedural or bitmap), lighting, coloring, shading, bump mapping, and other such object appearance data. Once the appearance data is applied to the object wireframes, for example, the final rendered image can be displayed via the device.

As mentioned, the rendering process can take advantage of a number of different components, such as pixel shaders. Pixel shaders can compute the color and other attributes of each individual pixel, or "fragment," of an object. Shading can address how different types of scattering light are distributed across a surface. An example of shading is texture mapping, where an image is used to specify the diffuse color at each point on a surface, giving it more apparent detail. Some pixel shaders can output one screen pixel as a color value, or pixel value, while other shaders can provide multiple pixel values as output. Pixel shaders can apply lighting values, for example, as well as applying bump mapping, shadows, specular highlights, or translucent effects, among others. A pixel shader can perform various other tasks as well, such as adjusting the pixel depth or outputting multiple colors. While a pixel shader might only output a value for a single pixel, the pixel shader can sample values for nearby pixels as well, this can allow for effects such as blurring or edge detection. Pixel shaders can also be applied to various sprites or textures in the rendering pipeline, and in some cases can function as a filter for a video stream after the stream has been rasterized.

As mentioned, many rendered scenes will involve a separate pass through the rendering pipeline for each image to be displayed. This can involve binding the render targets, sampling the render targets after binding, unbinding the render targets, then resolving the sampled data into textures. Any subsequent pass that utilizes this data for a subsequent frame would then have to re-bind the render targets for subsequent sampling. There is no ability in conventional rendering approaches, such as those based on the high-level shading language (HLSL), to fetch data directly from the render targets. Further, the need to unbind the render targets prevents the data from remaining in GPU memory, or GMEM, which then results in extra data round trips between the CPU and the GPU.

In order to overcome these and other deficiencies in such rendering processes, approaches in accordance with various embodiments can ensure that render target data remains in GMEM, which relieves stress on the CPU due to excess round trips to retrieve and bind data. This can be implemented in at least some embodiments by avoiding unbinding of the render targets throughout the relevant section of the rendering pipeline, such as may correspond to the GMEM render path. In some embodiments the render targets can have a flag set to indicate that the render target should not be unbound from the GPU for the subsequent pass. Further, since the render targets remain bound to the GPU the data can be fetched directly from the render targets. Certain rendering approaches, such as Metal provided by Apple Inc., allow for such direct fetching of data that does not require first resolving to a texture. Since the render targets are bound to the GPU, the data can be fetched straight from on-chip memory, which provides a significant performance improvement over conventional approaches where the textures to be sampled reside on slower memory elsewhere on the device. Such direct fetching is not possible in all rendering technologies, however, as languages such as HLSL do not provide for such functionality.

Accordingly, approaches in accordance with various embodiments provide for the use of dedicated special texture slots that can be used with HLSL and other such shading technologies. These special texture slots can be sampled, and the sampling data converted in Metal, or another such shading technology (such as GLSL for OpenGL or the SPIR-V Binary Intermediate Language from the Khronos Group), to fetch from GMEM instead, which provides enhanced performance over conventional approaches as discussed previously. In one embodiment, the HLSL cross compiler can be modified to detect when one of the special registers is being used, and can output the necessary shader instructions (i.e., Metal instructions) to store render targets in the specified locations. Further, the (Metal) shader instructions can be output so as to sample from those render targets directly. In this way, although not natively supported by HLSL the main render targets can be caused to stay within the GPU memory in order to be available for reuse on subsequent passes, which can reduce the overhead otherwise needed to transfer the large textures between CPU memory and GPU memory.

Figure 2:
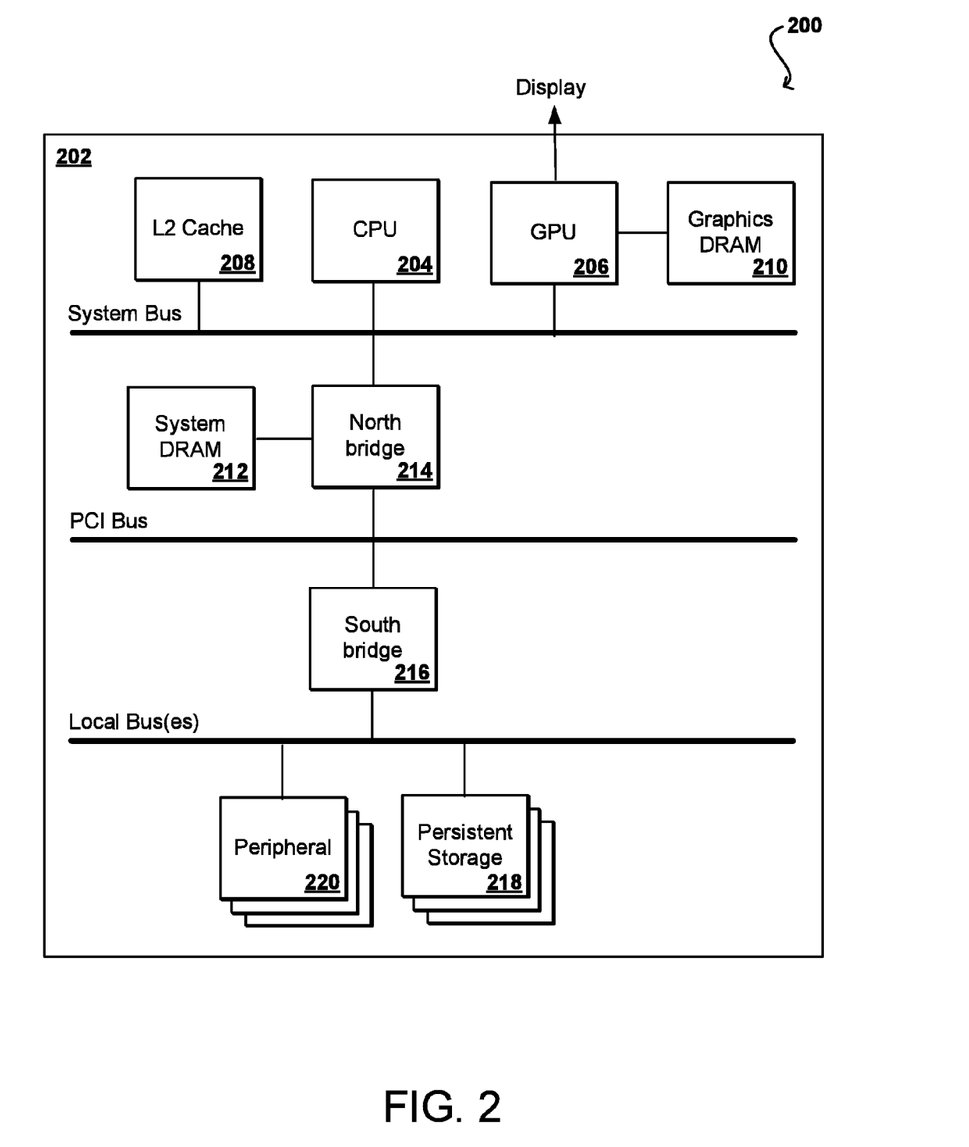
FIG. 2 illustrates an example configuration of components of a computing device that can be utilized in accordance with various embodiments.

FIG. 2 illustrates components of an example computing device 200 that can be utilized to implement aspects of the various embodiments. In this example, a central processing unit (CPU) 204 and a graphics processing unit (GPU) 206 are both connected to a high speed system bus (or frontside bus (FSB)) connected to a north bridge 214 (or host bridge) chip in the core logic chipset architecture of the computing device. The north bridge 214 is connected to the south bridge 216 chip, or I/O controller hub, which works with the north bridge to enable communications between the CPU and various peripheral and other devices. The south bridge traditionally implements the slower capabilities of the motherboard and is not directly connected to the CPU. It should be understood, however, that in some embodiments the architecture resides on a single chip or various functionality of the bridges is incorporated in the CPU, among other such options. Further, in some embodiments there can be multiple processors or processor cores for either the CPU or GPU, or both.

As illustrated, there can be various types of memory accessible to different components of the computing device. For example, the CPU 204 can utilize one or more level two (L2) cache components 208 that are external to the microprocessor. In some instances this cache memory, or secondary cache, can reside on a separate chip. This cache can be used in addition to any level one (L1) cache present inside the CPU itself. The CPU 204 can also access system memory, such as system DRAM 212, through the north bridge 214. A GPU 206 can also be connected by the high speed system bus, and may have its own dedicated graphics DRAM 210 or other such memory. The GPU can also access the system DRAM 212 through the north bridge 214. As mentioned, the south bridge 216 can enable communication with various peripheral devices 220, some of which can be used to provide input useful in determining the content to be rendered, such as by providing control or viewing input. The south bridge can also enable a slower connection to persistent storage 218, such as a hard drive or flash drive, which might persistently store a copy of the content to be rendered on the device, where that content can be loaded into local memory for rendering purposes.

Figure 3:
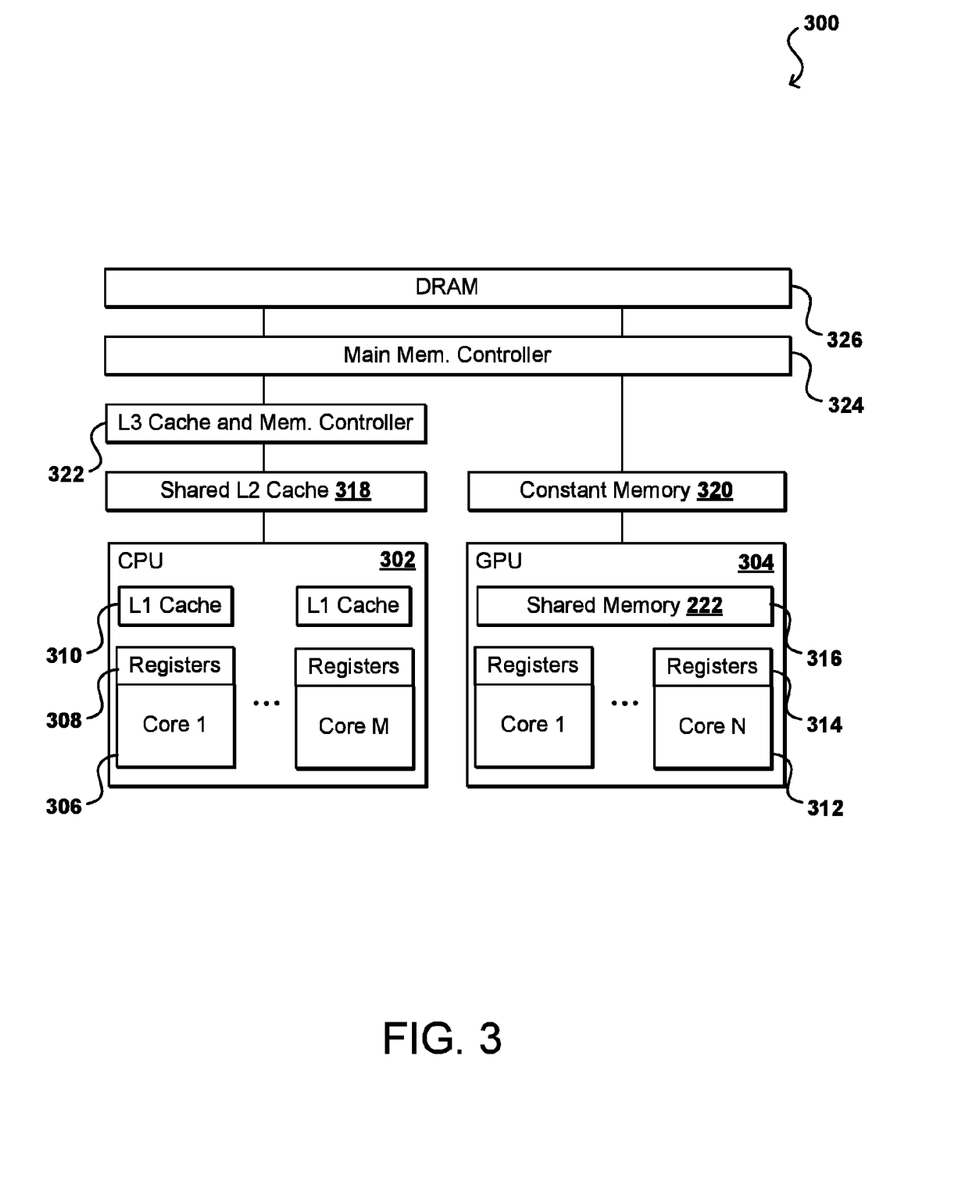
FIG. 3 illustrates memory components that can be used with central processing units and graphics processing units in accordance with various embodiments.

FIG. 3 illustrates an exploded view 300 of example processor and memory components such as those illustrated in FIG. 2. In this example it is shown that a CPU 302 can include multiple processor cores 306, each of which can have dedicated memory registers 308. The CPU 302 can also include multiple L1 cache 310 instances, such as one for each core 306. The CPU 302 can also pull data from a shared L2 cache 318, although multiple L2 caches can be used as well in other embodiments, and an L3 cache 322 that might have its own memory controller. There can be other numbers or arrangements of cache memory used in other implementations as well. The CPU 302 can also communicate with the main system memory 326 via a main memory controller 324 or other such component.

The GPU 304 can also include multiple processor cores 312, which can also have respective registers 314. The GPU can have shared memory 222 that it can use to temporarily store a limited amount of data for processing as well. The GPU 304 can also have access to constant external memory 320 and system memory 326 as well. As mentioned, there are many different architectures available with different selections and/or arrangements of components, and many of these can take advantage of the approaches discussed and suggested herein as well within the scope of the various embodiments.

In order for such a selection of components to render an image in near real time, the appropriate data will generally pass through an appropriate graphics pipeline. A graphics pipeline usually starts from an application, such as a gaming application or Web browser, for example, from which user input such as gaming input is received 402, as illustrated in the example rendering pipeline 400 of FIG. 4. As mentioned, the input can correspond to a change in point of view, zoom level, lighting, position, pose or other such aspect affecting how one or more objects in the scene will appear once rendered. In this example, the application (or a component or function associated with the application) will perform 404 an API call to provide information associated with the input. As an example, an OpenGL-based application can make calls into an OpenGL API to provide information about drawing primitives to be displayed, vertex data, the appropriate rendering mode, etc. The application and API portions of the pipeline can be implemented in software, while the other portions of the pipeline are often implemented entirely in hardware. In some embodiments, the OpenGL interface is exposed by a graphics driver implemented in software on the CPU of the computing device. The driver can translate and/or interpret the OpenGL commands into commands that are specific to the GPU. Direct3D and other APIs can be used for similar calls as well in other embodiments, but the resulting GPU command and data stream can be the same. The graphics commands can be provided 406 over a high speed bus, such as a PCI bus. The vertex data can be modified, such as to transform vertices. Vertex indices can also be specified alongside the vertex data.

Figure 4:
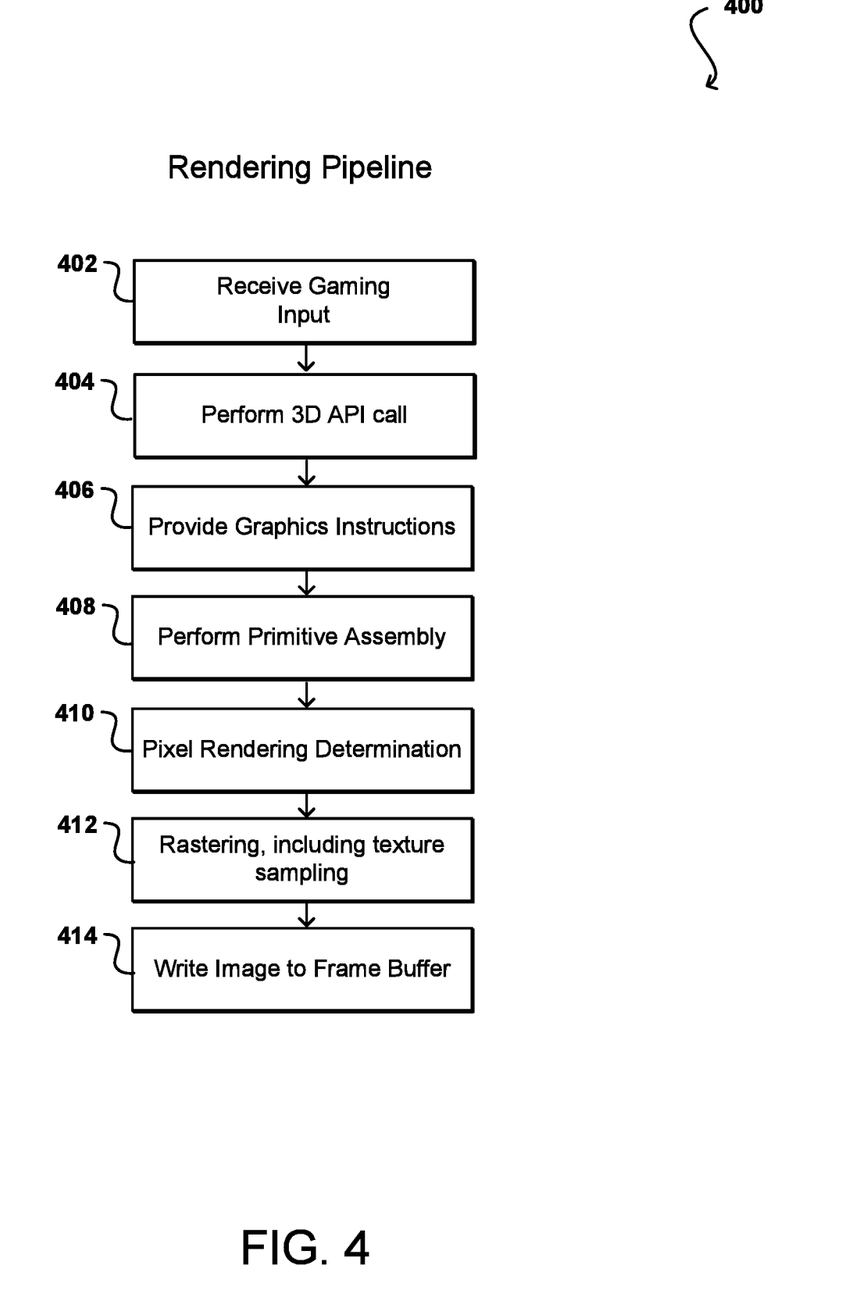
FIG. 4 illustrates an example rendering pipeline that can be utilized in accordance with various embodiments.

After the graphics instructions are received, a primitive assembly step can be performed 408. During primitive assembly, the list of vertices can be used to create the primitive shapes according to the current rendering mode. A pixel rendering determination step can be performed 410, wherein the vertex data is analyzed to determine which pixels need to be drawn, which vertex attributes are blended across multiple pixels, etc. Other portions of this step can include blending fragments, performing vertex shading and illumination, performing projection and clipping, and performing appropriate screen mapping, among other such tasks. Various raster operations can then be performed 412 to determine the final pixel value for the various pixels to be drawn, where tasks such as scan conversion and pixel shading can occur. Once the pixel values are all determined, the resulting image data can be written 414 to a frame buffer, such as an area of memory on a video card that stores the final pixel values. The entire frame buffer can periodically (i.e., at least 60 times a second) be read and the data output as a signal to the display screen, monitor, or other such display device. A frame buffer in at least some embodiments contains a depth buffer along with the other textures. A frame buffer can be created like any other object in OpenGL, for example, and rendering can be performed by binding the frame buffer and drawing the scene using any appropriate drawing approach known or used for such purposes.

As mentioned, conventional approaches (as well as those based on HLSL) require a separate pass through such a rendering pipeline for each image or frame of rendered content to be displayed. This can involve binding the render targets, sampling the render targets after binding, unbinding the render targets, and resolving the sampled data into textures as discussed previously. Subsequent passes then re-bind the render targets for sampling. Approaches in accordance with various embodiments instead can ensure that render target data remains in GMEM, without being unbound from the GPU through the render pipeline, which relieves stress on the CPU due to excess round trips to retrieve and bind data.

The high-level shader language (HLSL) is a shading language developed by Microsoft for the Direct3D API to augment the shader assembly language. HLSL is considered to be analogous to the GLSL shading language used with OpenGL and is similar to the NVidia Cg shading language, among others. HLSL programs can take the form of pixel shaders, vertex shaders, compute shaders, geometry shaders, and tessellation shaders, among others.

Figure 5:
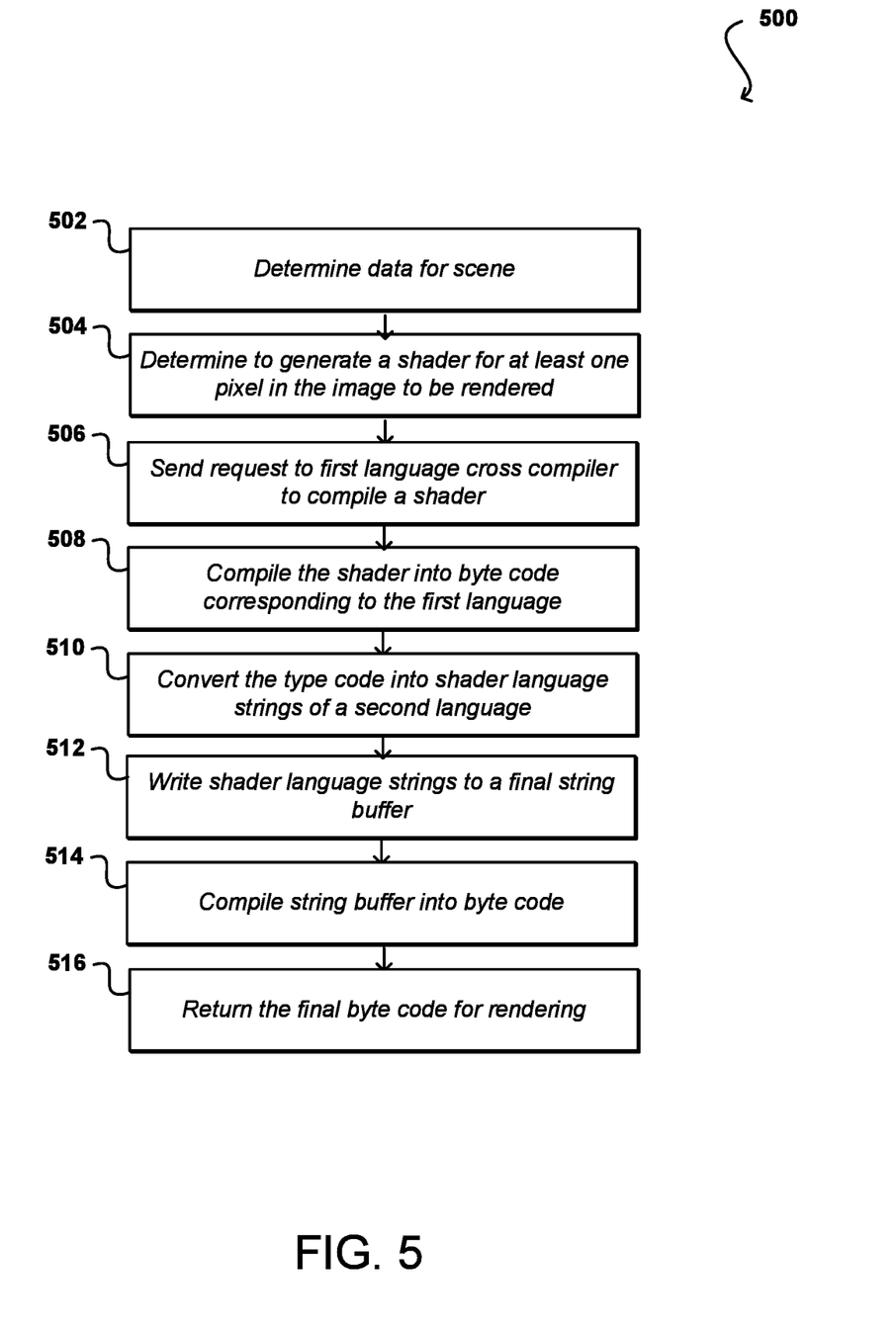
FIG. 5 illustrates an example process for converting between shading languages that can be utilized in accordance with various embodiments.

FIG. 5 illustrates an example process 500 for rendering content that can be used in accordance with various embodiments. It should be understood that there can be fewer, additional, or alternative steps performed in similar or alternative orders, or in parallel, within the scope of the various embodiments unless otherwise stated. In this example, rendering data is determined 502 for an image to be rendered for display on a computing device. As part of the build process a determination can be made 504 to generate a shader for at least one pixel for the image. A request can be sent 506 to a cross compiler to compile a shader. In an HLSL environment, this can be an HLSL cross compiler. Once the HLSL shader is obtained, the shader can be compiled 508 into byte code, such as DirectX byte code. As part of the build process, an HLSL-based application can utilize an fxc.exe HLSL code compiler to compile .hlsl files into binary shader object files or byte arrays, as may be defined in header files. The compile approach used can depend at least in part upon the size of the .hlsl file, as the presence of a significant amount of byte code in a header can increase the initial load size of the application. Including byte code in a header can cause the code to reside in memory even after the shader is created, but can also reduce code complexity and simplify shader creation.

Once the byte code is generated, the byte code can be converted 510 to appropriate shader language stings for the target environment, as may include Metal or OpenGL shader language strings. The converted language strings can be written 512 to a final string buffer. The string buffer can be compiled 514 into byte code, and the final byte code returned 516 for rendering or other processing in the relevant environment, such as the Metal or OpenGL environment. This illustrates how code, such as the HLSL cross compiler code, can function in accordance with various embodiments.

Figure 6:
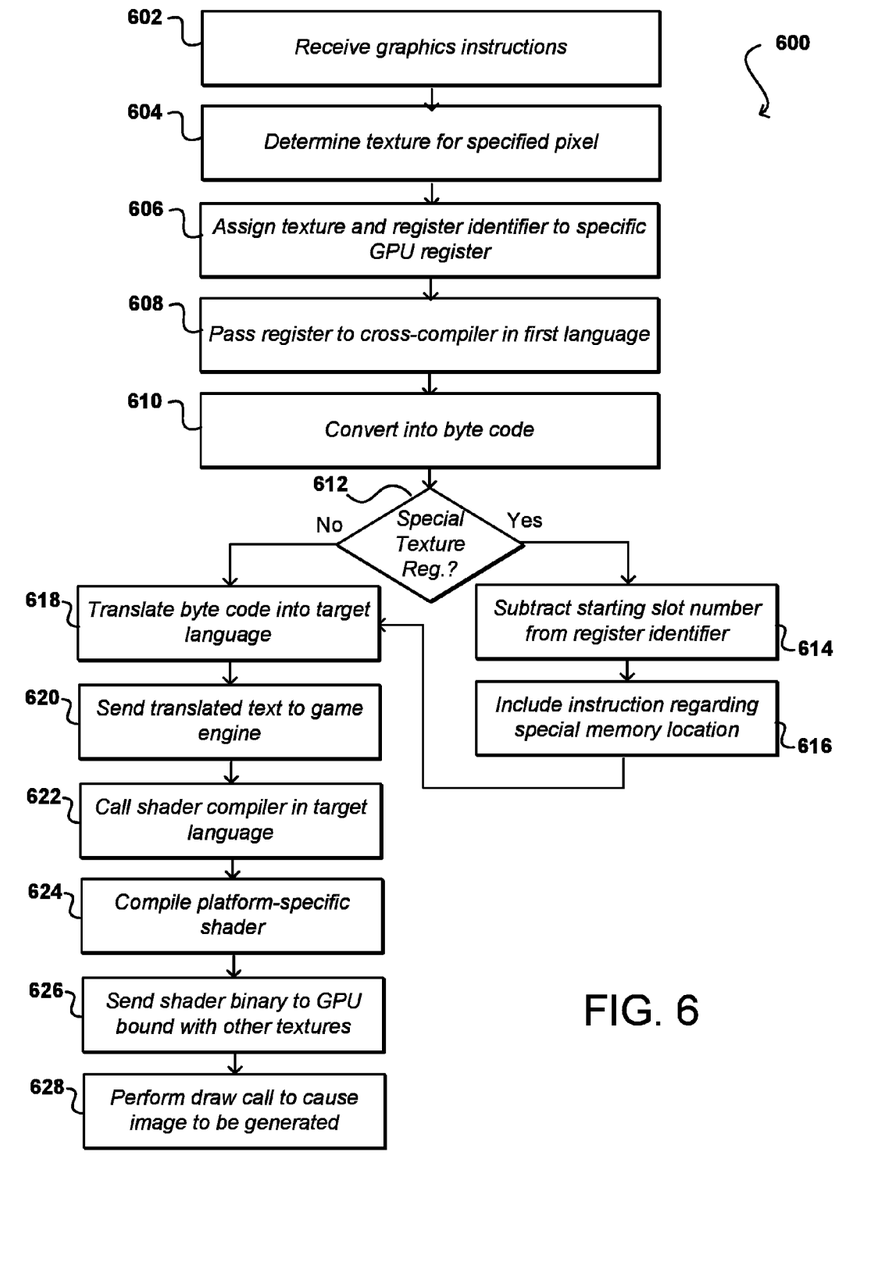
FIG. 6 illustrates an example process for determining where to obtain texture data that can be utilized in accordance with various embodiments.

FIG. 6 illustrates an example process 600 for determining when a shader wants to sample a render target that is resident in GPU memory, or GMEM, and outputting the appropriate shader instructions that can be utilized in accordance with various embodiments. As discussed, using GMEM refers to the ability to sample a render target texture that is resident in the GPU memory without having to first resolve it to a texture then bind that texture as an input to the pixel shader. The GMEM acronym is used herein to refer to use of one of the render target textures in the GPU memory. As mentioned, languages such as HLSL do not expose functionality that enables information to be fetched from a render target without having to first resolve that render target into a texture and then re-bind that texture into the pixel shader.

In this example, the graphics instructions are received 602 from an application, such as through an appropriate API. For each of a number of pixel shaders, a texture is determined 604 that is appropriate for a particular pixel and the texture is assigned 606 to a specific register of the GPU, and a determined register identifier is assigned to that register. In some instances, as discussed elsewhere herein, a texture might qualify as a "special" texture that would be advantageous to leave in GPU memory, and thus can be assigned a special texture register identifier. An example of a special register identifier is T120, indicating that the register is a texture ("T") register having register number 120, which is outside the normal range of GPU registers in at least some devices. The register can be passed 608 into the cross compiler and converted 610 into byte code. A determination can be made 612 as to whether the register is a "special" texture register with a register number greater than 120, which as indicated previously in this example is the GMEM starting slot for textures. If not, the process can continue. If the register number is greater than 120 in this example, the starting slot number (e.g., 120) can be subtracted 614 from the assigned register number (or register identifier) to return to a register number of 0. For register numbers where the number was changed, an instruction can be included 616 indicating to the metal shader compiler, for example, that a special memory location on the GMEM is storing the structure. An appropriate translation component can then begin to translate 618 the byte code into the target language, such as by converting HLSL byte code to Metal language. In embodiments where component arranging or swizzling may occur, this can be applied to generate the final translated instruction. The translated text can be sent 620 to the appropriate game engine to call 622 the appropriate shader compiler, such as a Metal shader compiler. The final platform-specific shader can be compiled 624 and the shader binary sent 626 to the GPU bound with other textures to be used to perform 628 the subsequent draw call to cause the image to be generated for display on the device.

As mentioned, an advantage to such an approach is that data can be fetched from a render target without having to first resolve the data to a texture. This is particularly advantageous when using languages such as HLSL where such functionality is not natively supported. The shader language conversion can occur and the data stored in a designated register in order to enable the data to be fetched as appropriate. In one embodiment, four register slots are used for storing this data. An issue experienced with languages such as HLSL is that there is no native way to determine the type of a resource known to a register. HLSL has register sets, for example, so the type is assume based upon being within a particular range of register sets. Approached in accordance with various embodiments can utilize this approach to define types for various slot ranges, such as defining anything between register slots 96 and 103 to correspond to a single floating point value texture (a one component float), anything between register slots 104 and 111 to be a two component floating point texture, anything between slots 112 and 119 to be a three component floating point texture, and everything above slot 120 to be a vector of four floating point numbers, among other such options. This can be used to ensure that when the necessary resource is bound that the components for the metal shader language are established correctly based on the range of registers to which that texture is being assigned. Since the ranges and types are known, then the type that should be associated with the pixel output color can be explicitly defined, along with the register ID and other such information.

Thus, the cross compiler source code (such as HLSL code) can be modified in various embodiments so that whenever a specified register is being used, such as one of four different register slots used for such purposes, the program can be modified so that it will then take the texture that was specified to go into that slot, output the correct platform-specific shader language (e.g., Metal) so that the texture or rendering target is stored into this special memory location. The pixel shaders can then be caused to extract the information from that texture without having to rebind it and go through the process discussed previously.

Figure 7:
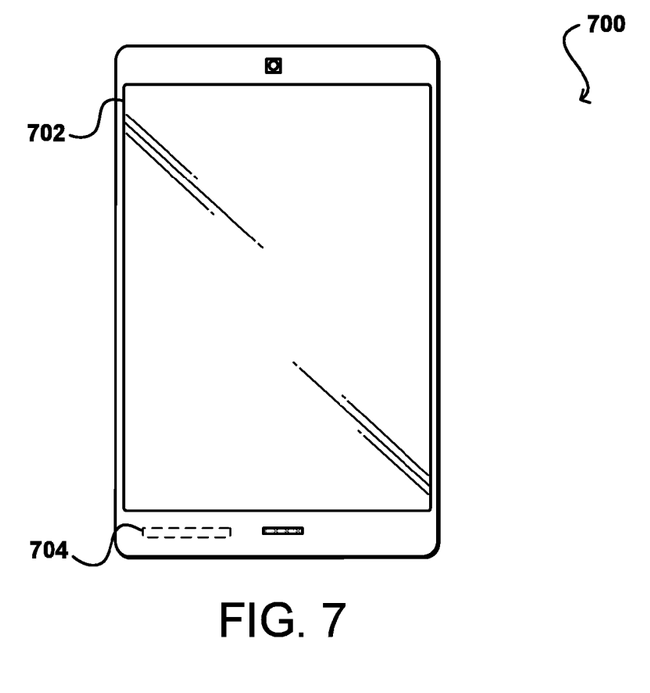
FIG. 7 illustrates an example computing device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 600 has a display screen 702 operable to display information to a user facing the display screen (e.g., on the same side of the computing device as the display screen). The computing device can include various elements enabling a user to provide input to the device, such as a touch-sensitive display screen 702, at least one camera, a microphone, a keyboard or touchpad, or other such elements. The example computing device 700 also includes at least one communication mechanism 704 enabling the device to send and receive communications over at least one network. These networks can include, for example, a local area network (LAN), the Internet, an intranet, a cellular network, a wireless data communications network, and the like.

Figure 8:
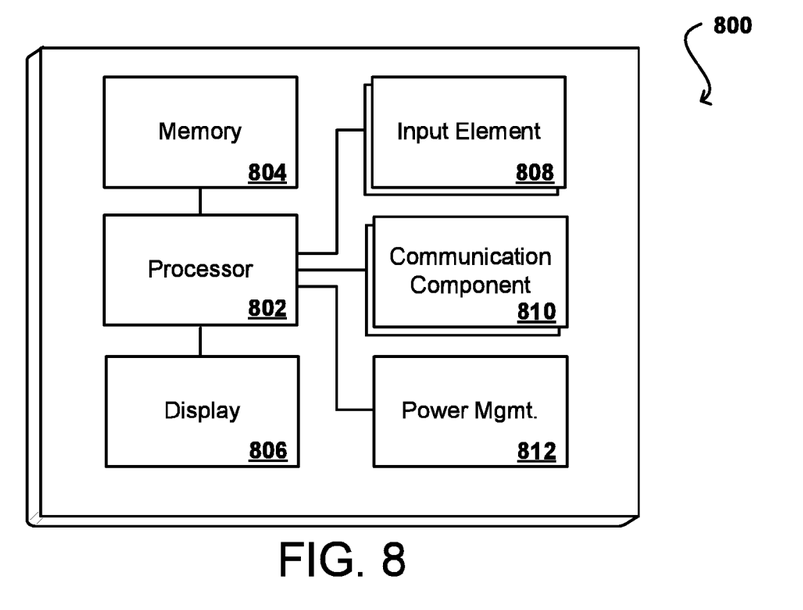
FIG. 8 illustrates components of an example computing device such as the one illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one input element 808 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 800 of FIG. 8 can include one or more communication components 810, such as a Wi-Fi, Bluetooth, RF, wired, or wireless communication system. The device in many embodiments can communicate with a network, such as the Internet, and may be able to communicate with other such devices. The device 800 also can include at least one power management component 812, which can be implemented through hardware and/or software. This can include a battery and other appropriate components.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers or cloud storage services, including without limitation those commercially available from Oracle®, Amazon®, Microsoft®, Sybase®, and IBM®, such as the Amazon Simple Storage Service (a.k.a. Amazon S3).

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other non-transitory computer-readable storage medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving, from a gaming application, instructions to render a scene of content for display on a display screen of a computing device, the instructions corresponding to a first shading language;
   determining a set of pixels to be rendered for an image frame of the scene;
   assigning a respective texture for each pixel of the set of pixels to a respective register of a graphics processing unit (GPU), the respective register having a register identifier indicating that the register is storing texture data;
   converting the instructions for a respective register to byte code;
   modifying a register slot number for the respective register based at least in part upon a range of registers associated with a respective texture type;
   translating the byte code into a second shading language corresponding to a platform to be used in rendering the scene;
   sending the translated code, the register slot number, and a texture-specific instruction to a shader compiler in the second shader language, wherein the texture data is able to be fetched directly from the respective register of the graphics processing unit;
   generating a shader binary using shader compiler; and
   storing the resulting pixel data for each of the set of pixels to a frame buffer for use in rendering the scene of content.

2. The computer-implemented method of claim 1, further comprising:
   setting a flag for the respective register to ensure that the respective register is not unbound from the GPU during a current pass through a rendering pipeline corresponding to the scene; and
   reusing at least a subset of the texture data in the respective registers for at least one subsequent pass through the rendering pipeline.

3. The computer-implemented method of claim 1, further comprising:
   designating at least one respective register as a special texture register, wherein the register slot number for the special texture register is outside a slot number range of the GPU.

4. The computer-implemented method of claim 3, wherein the texture data in at least one respective register is a render target that is able to be sampled without having to first resolve the render target to a texture and bind that texture to the GPU.

5. The computer-implemented method of claim 1, wherein the first shader language is the high level shading language (HLSL) and the second shader language is one of the Metal shader language, the OpenGL Shading Language (GLSL), or SPIR-V.

6. A computer-implemented method, comprising:
   determining object data for a set of objects to be rendered as part of an image to be displayed;
   determining a set of pixel shaders to be used in determining pixel values based at least in part on the object data;
   causing a respective texture for a pixel of the image to be stored to a respective register of a graphics processing unit (GPU), the respective register having a register identifier indicating that the register is storing texture data;
   designating the respective register as a special texture register, wherein the register identifier for the respective register includes a specified slot number outside a slot range for the GPU;
   performing a rastering process for the pixel using data fetched from the respective register of the GPU based at least in part upon the register identifier, in order to determine a pixel value for the pixel; and
   writing the pixel value for the pixel, with other pixel values for the image, to a frame buffer until such time as the pixel values in the frame buffer are retrieved for generating the image to be displayed.

7. The computer-implemented method of claim 6, further comprising:
   receiving, from a graphics application, graphics instructions for rendering the image, the graphics instructions corresponding to a first shader language; and
   translating the graphics instructions to a second shader language to be used in performing the rastering process.

8. The computer-implemented method of claim 7, wherein the first shader language is the high level shading language (HLSL) and the second shader language is one of the Metal shader language, the OpenGL Shading Language (GLSL), or SPIR-V.

9. The computer-implemented method of claim 7, wherein the graphics instructions are received to an application programming interface (API) associated with the second shader language.

10. The computer-implemented method of claim 6, wherein the register identifier includes the specified slot number and an indicator for special texture data being stored in the register.

11. The computer-implemented method of claim 10, further comprising:
    subtracting a texture starting slot number from the specified slot number before enabling the data to be fetched from the respective register of the GPU.

12. The computer-implemented method of claim 6, further comprising:
    directly sampling the data from memory of the GPU referred to by the respective register without first resolving the data to a texture and binding the texture to the GPU.

13. The computer-implemented method of claim 6, further comprising:

setting a flag for the respective register to ensure that the data in the register remains bound to the GPU during a current pass through a rendering pipeline corresponding to the image.

14. The computer-implemented method of claim 13, further comprising:
reusing at least a subset of the data in the respective register for at least one subsequent pass through the rendering pipeline.

15. The computer-implemented method of claim 6, further comprising:
compiling a pixel shader to byte code corresponding to the first shader language before translating the pixel shader to a second shader language.

16. A computing device, comprising:
a display screen;
a central processing unit (CPU);
a graphics processing unit (GPU); and
memory including instructions that, upon execution by at least one of the CPU or the GPU, cause the computing device to:
obtain object data for a set of objects to be rendered as part of an image to be displayed on the display screen;
determine a set of pixel shaders to be used in determining pixel values based at least in part on the object data;
cause a respective texture for a pixel of the image to be stored to a respective register of the GPU, the respective register having a register identifier indicating that the register is storing texture data, the register identifier having a register number outside a register range of the GPU;
perform rastering for the pixel using data fetched from the respective register of the GPU based at least in part upon the register identifier, in order to determine a pixel value for the pixel;
store the pixel value for the pixel, with other pixel values for the image, to a frame buffer; and
read the pixel values from the frame buffer in order to generate the image and cause the image to be displayed on the display screen.

17. The computing device of claim 16, wherein the instructions when executed further cause the computing device to:
receive, from a graphics application to the computing device, graphics instructions for rendering the image, the graphics instructions corresponding to a first shader language; and
translate the graphics instructions to a second shader language to be used in performing the rastering process, wherein the first shader language is the high level shading language (HLSL) and the second shader language is one of the Metal shader language, the OpenGL Shading Language (GLSL), or SPIR-V.

18. The computing device of claim 16, wherein the register identifier includes the register number and an indicator for texture data being stored in the register, and wherein the instructions when executed further cause the computing device to:
cause a texture starting slot number to be subtracted from the specified slot number before enabling the data to be fetched from the respective register of the GPU.

19. The computing device of claim 16, wherein the instructions when executed further cause the computing device to:
directly sample the data from the respective register of the GPU without first resolving the data to a texture and binding the texture to the GPU.

20. The computing device of claim 16, wherein the instructions when executed further cause the computing device to:
set a flag for the respective register to ensure that the register remains bound to the GPU during a current pass through a rendering pipeline corresponding to the image; and
reuse at least a subset of the data in the respective register for at least one subsequent pass through the rendering pipeline.

* * * * *